United States Patent [19]

Shea

[11] Patent Number: 5,646,923
[45] Date of Patent: Jul. 8, 1997

[54] SYSTEM AND METHOD FOR HIDING P-LIST ENTRIES FOR A DISK FROM AN INITIATOR USING A SMALL COMPUTER SYSTEM INTERFACE

[75] Inventor: Michael John Shea, Rochester, Minn.

[73] Assignee: International Business Machines Corporation, Armonk, N.Y.

[21] Appl. No.: 153,452

[22] Filed: Nov. 17, 1993

[51] Int. Cl.[6] .................................................. G11B 5/09
[52] U.S. Cl. .................................................. 369/58; 369/47
[58] Field of Search .................................. 369/47, 48, 32, 369/50, 54, 58, 33; 360/48, 49, 53, 54

[56] References Cited

U.S. PATENT DOCUMENTS

| | | |
|---|---|---|
| 4,459,696 | 7/1984 | Kojima . |
| 4,498,146 | 2/1985 | Martinez ........................ 369/58 X |
| 4,656,532 | 4/1987 | Greenberg et al. . |
| 4,858,236 | 8/1989 | Ogasawara . |
| 4,972,316 | 11/1990 | Dixon et al. . |
| 5,075,804 | 12/1991 | Deyring ........................ 369/54 X |
| 5,083,264 | 1/1992 | Platteter et al. . |
| 5,303,219 | 4/1994 | Kulakowski et al. ............ 369/58 X |

Primary Examiner—P. W. Huber
Attorney, Agent, or Firm—Paul W. O'Malley; Andrew J. Dillon

[57] ABSTRACT

A disk drive provides a defect list for each recording surface itemizing selected areas of recording surface by location, size and graded by an expected abnormal error rate. The defect list is utilized upon formatting of a recording surface to rate sectors as available or unavailable depending upon a map of data types to be written to the sectors and alignment of the map to the defects.

4 Claims, 6 Drawing Sheets

SYSTEM AND METHOD FOR HIDING P-LIST ENTRIES FOR A DISK FROM AN INITIATOR USING A SMALL COMPUTER SYSTEM INTERFACE

BACKGROUND OF THE INVENTION

1. Technical Field

This invention relates to personal computer systems and in particular to a method and system for improving operation of direct access data storage devices (DASDs) used with such systems. Still more particularly the invention relates to selectively hiding marginally defective areas of a disk in a disk drive from an initiator during formatting of the disk and during subsequent inquiries by an initiator about the number and location of these areas.

2. Description of the Related Art

Disk drives are one type of DASD used for long term storage of data in personal, and other, computer systems. A disk drive has at least one rotatable magnetic disk for data storage. Data are physically recorded as a series a magnetically polarized regions on the disk. The magnetically polarized regions are disposed in a layer of magnetic material coating the major surfaces of the disk. Related magnetically polarized regions are serially arrayed along either a plurality of concentric data tracks or spiral data tracks. A read/write transducer may be used to read data from or write data to the various tracks on the disk while the disk moves underneath the transducer.

While it is desirable to make the layer of magnetic material or storage media free of defects, the presence of areas which are irregular is not cause for rejection of the disk provided that the areas are not too extensive. That is, the irregular areas cannot be too irregular or cover so much of the disk that the disk cannot meet a guaranteed minimum storage capacity. However, just what in the nature of an irregularity of the magnetic layer constitutes a defect depends on a number of factors, chief among which is areal density of the data to be recorded. For example, in disk drives using "sliders", the slider carries the read/write transducer and flies just off the surface of a rotating disk. Progress in reducing slider fly height has made the criteria for judging a magnetic layer "defect free" ever more stringent. As the read/write transducer comes closer to the disk surface, higher areal densities of data are achieved. Put another way, the apparent size of flaws becomes larger and thus smaller flaws constitute defects. A high degree of surface smoothness to assure close control of fly height and great regularity in quality of the material, are required to support higher areal densities.

A factor which could support a looser definition of "defect" is the use of error correcting codes (ECC) in association with data fields being physically recorded. ECC is a type of redundant data. A detailed understanding of how ECC works is not important to understanding the present invention. What the use of ECC allows is the tolerance of some level of error (either soft or hard) in the data field without loss of the data in the field. If all of the physical records on a disk were backed by redundant data such as ECC, the disk might have the same number and type of irregularities as a disk not receiving data not backed by ECC, but would be taken to have fewer defects. Incidentally, soft error is the incorrect readback of a correctly recorded datum. A hard error is an error in the record.

However, various parts of a disk surface will typically be used for storing particular types of data, some of which may be backed up by use of ECC and some of which is not. For example, in hard disk drives supplied by International Business Machines Corporation, data fields are covered by ECC while ID fields for the data fields are not. Manufacturers of disk drives do not usually know how drives will be used or which areas on the disk will be used to store particular types of data. Only when the disk has been formatted (a process which may reoccur several times during the service life of the product) is the use to which a particular area is to be put known.

To permit formatting of disk drives by personal computer manufacturers, and by end users after disk drives have been placed in service, disk drive manufacturers subject the magnetic layers on the major surfaces of a disk drive to a so-called "surface analysis test" (SAT) to locate defects by size and area. The manufacturers then supply disk drives with a list of surface defects identifying locations and size (the "P-List"). Generally no qualification of the surface has been made on the basis of degree of defectiveness. Areas of the disk are categorized as either good or bad.

SUMMARY OF THE INVENTION

An object of the present invention is to provide a method and apparatus for improving operation of direct access data storage devices (DASDs) used with personal computer systems.

Another object of the invention is to provide a method and system for selectively hiding marginally defective areas of a disk in a disk drive from an initiator.

The above and other objects are achieved as now described. A method of formatting recording surfaces of a disk drive volume includes recording an ordered list on each recording surface in the disk drive volume whose entries identify one or more selected areas on the recording surface by location, size and grade of defect. A plurality of sectors are fitted to each track of a surface in turn. During formatting, as each entry in the ordered list becomes current, the current track is checked against the current entry to determine if the entry is for a sector on the current track. If the current entry is not for a sector on the current track, writing the plurality of sectors or any remaining sectors in the plurality of sectors to the current track proceeds. If the current entry is for a sector in the current track, it is determined if the grade of current entry allows writing backed up data to the sector. If the grade of the current entry allows writing backed up data, the selected area is measured by size and location against a nearest field for backed up data for fit. If the selected area fits the nearest field for backed up data, the selected area is marked as allowed for data storage. If the selected area fails to fit the nearest field for backed up data, the sector is marked for data storage as unavailable. If the selected area fails does have a grade for supporting backed up data, marking the sector as unavailable. The availability flags for sections in a track are stored to a format table.

BRIEF DESCRIPTION OF THE DRAWINGS

The foreground aspects and other features of the present invention are explained in the following written description, taken in connection with the accompanying drawings, wherein.

DETAILED DESCRIPTION OF THE INVENTION

The following detailed description is of the best presently contemplated mode for carrying out the invention. This description is not to be taken in a limiting sense but is made merely for the purpose of illustrating the general principles of the invention since the scope of the invention is best defined by the appending claims.

I. Organization of a Computer System

Figure 1:
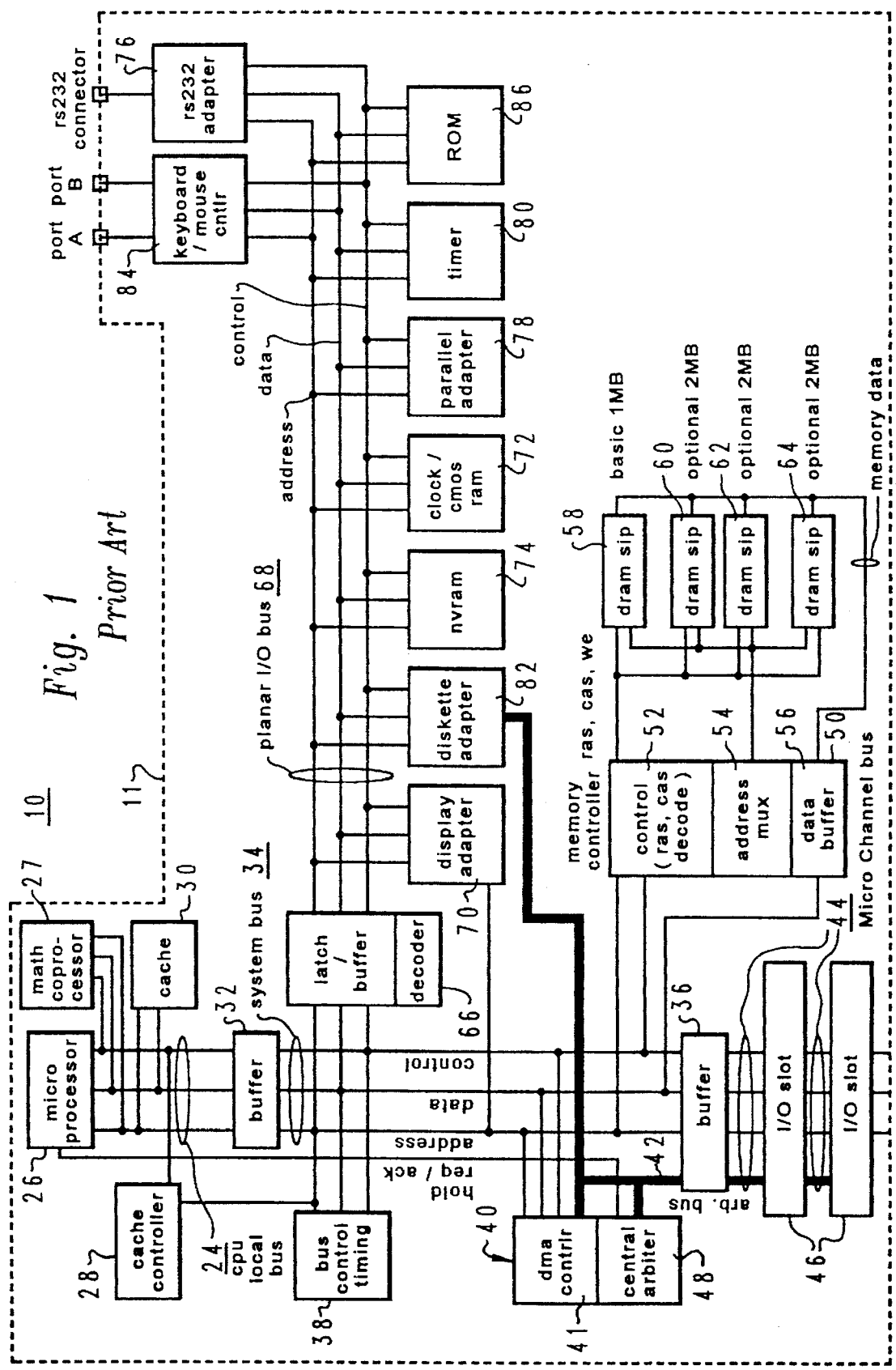
FIG. 1 is a block diagram of a personal computer system with which the present invention can be employed.

Referring to FIG. 1, there is shown a block diagram of the Personal Computer System 10 illustrating the various components of the Computer System. FIG. 1 further illustrates components of the planar 11 and the connection of the planar 11 to the I/O slots 46 and other hardware of the Personal Computer System 10. Connected to the planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. Among suitable microprocessors for CPU 26 are the 80386 and 80486 sold by Intel.

CPU local bus 24 (comprising data, address and control components) provides for the connection of CPU 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a Direct Memory Access (DMA) unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. I/O slots 46 may be used for access to mass storage devices through hard drive controllers described below. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 1 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70, a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes a Basic Input Output System (BIOS) which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

II. DASD Features and Operation

Figure 2:
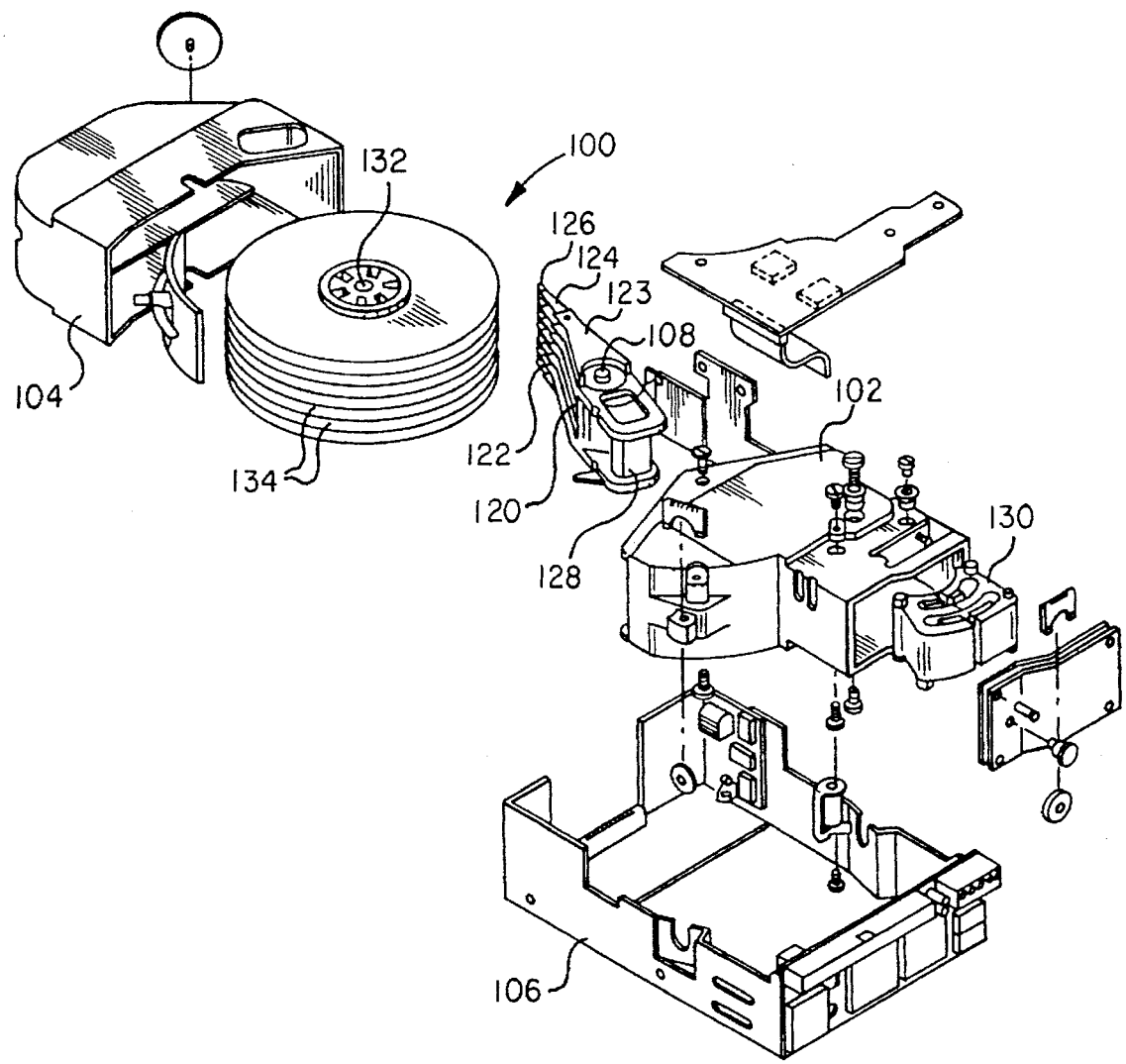
FIG. 2 is an exploded perspective view of a disk drive.

FIG. 2 is an exploded view of a disk drive 100. The disk drive 100 includes a housing 102, and a housing cover 104 which, after assembly, is mounted within a frame 106. Rotatably attached within the housing 102 on an actuator shaft 108 is an actuator arm assembly 120. One end of the actuator arm assembly 120 includes an E block or comb like structure 122 having a plurality of arms 123. Attached to the separate arms 123 on the comb or E block 122, are load springs 124. In this case, the load springs form the suspension. Attached at the end of each load spring is a slider 126 which carries a pair of magnetic transducers or the head. The transducers may be of an inductive type, or may include a read transducer of a magnetoresistive type. On the other end of the actuator arm assembly 120 opposite the load springs 124 and the sliders 126 is a voice coil 128.

Attached within the housing 102 is a pair of magnets 130. The pair of magnets 130 and the voice coil 128 are key parts of a voice coil motor which applies a force to the actuator arm assembly 120 to rotate it about the actuator shaft 108. Also mounted within the housing 102 is a spindle shaft 132. Rotatably attached to the spindle shaft 132 are a number of disks 134. In FIG. 2, eight disks are attached to the spindle shaft 132. As shown in FIG. 2, the disks 134 are attached to the spindle shaft 132 in spaced apart relation. An internal motor (not shown) rotates the disks 134.

Figure 3:
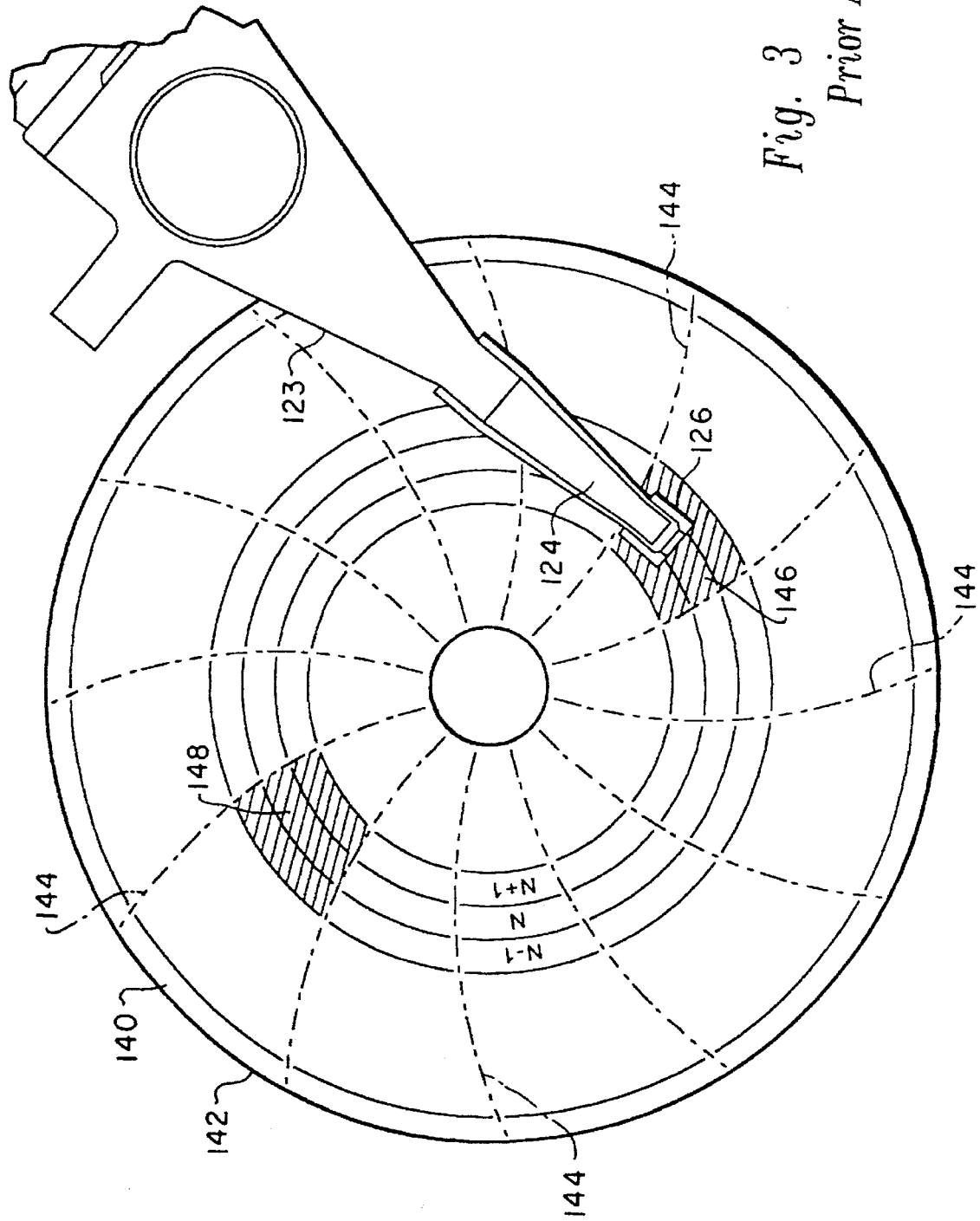
FIG. 3 is a top plan view of a disk.

FIG. 3 illustrates positioning of slider 126 by an arm 123 over one of a plurality of tracks (1 to N+1) on a magnetic surface of 140 of a disk 142. Each track is divided into segments or sectors by a plurality of track servo fields 144 extending radially from the center of disk 140 or from an intermediate track on the disk surface. The number of available sectors may increase with distance from the center of the disk. Track servo fields curve to conform to the travel of slider 126 at the end of rotatable arm 123. If disk rotational speed is constant, a transducer mounted to slider 126 encounters a track servo field 144 at strict intervals of times. If a linearly actuated armature is used, track servo fields 144 are straight. Tracking information is derived from servo fields 144 in a manner well known in the art. Slider 126 flies blind between servo fields. A P-list for each surface is written to a predetermined location of each surface not affected by the format unit command of the small computer system interface.

Figure 4:
FIG. 4 is a schematic illustration of the organization of field types on a disk.

FIG. 4 details the positional relationship of various fields on a formatted disk surface 140. Tracks N−1, N, and N+1 are depicted each having had written thereto a plurality of data fields 150. Each data field 150 is preceded by an ID field 152. Each data field 150 is followed by an ECC field 151. Tracks include format tables 153. While a data field generally includes a preliminary synchronization field (not shown), a second synchronization field (not shown) may be included after a servo field where it bisects a data field.

Some disk drives are formatted to have one data field per data sector positioned between each track servo field. The servo fields then function as data sector boundaries. In the formatting illustrated, a data field may straddle parts of more than one data sector and more than one data field may be positioned between a pair of servo fields.

Figures 5, 7A, 7B:
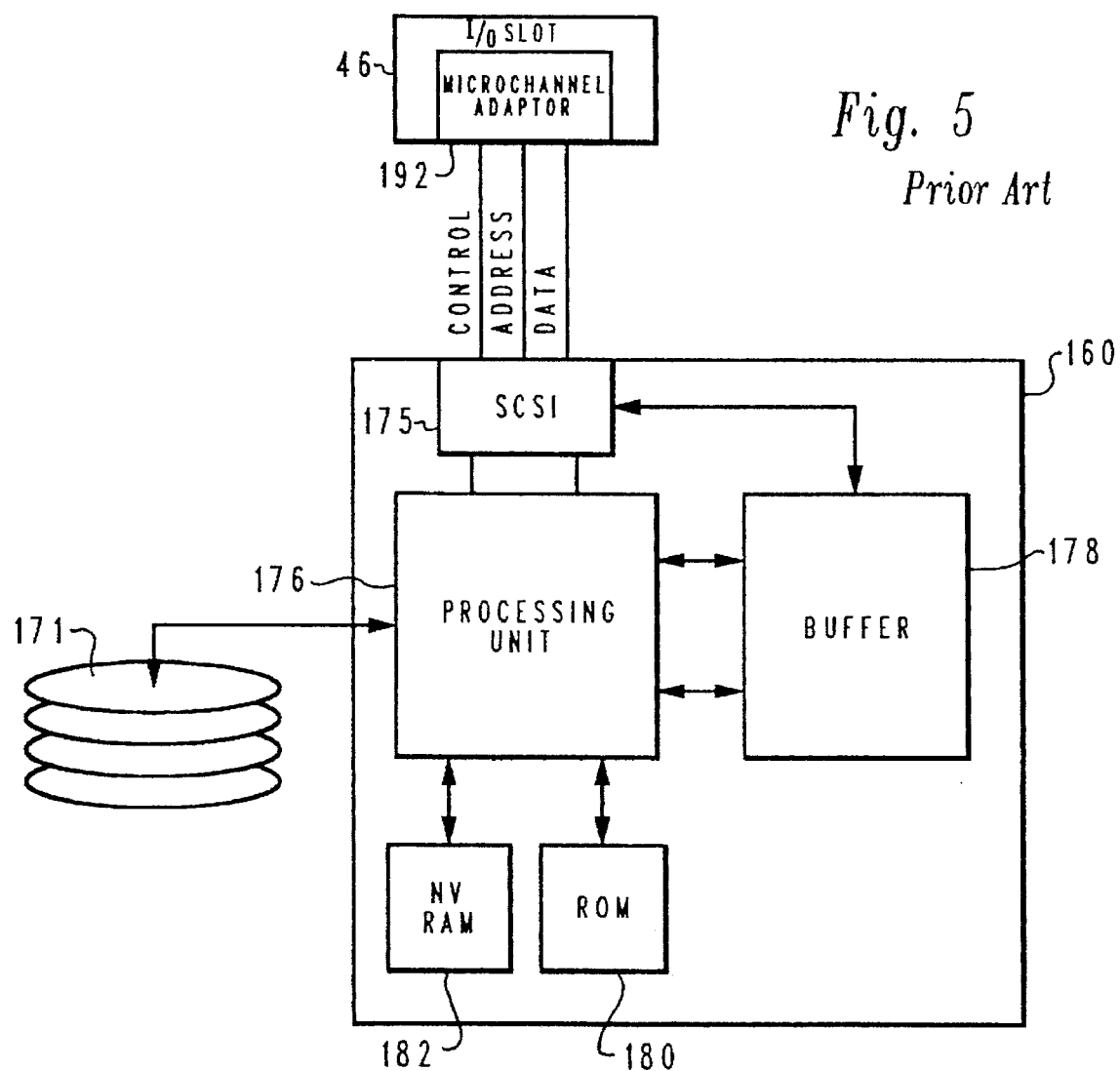
FIG. 5 is a block diagram of a controller unit for a direct access storage device, such as a disk drive.
FIGS. 7A and 7B illustrate data structures used by the process of FIG. 6.

FIG. 5 is a block diagram of a DASD controller 160 and disk drive 171. DASD controller 160 communicates with a host computer system through an interface 175 such as a small computer system interface (SCSI). For computer system 10 the SCSI 175 is connected to a microchannel adaptor 192 which may be plugged into an input/output slot 46 for microchannel bus 44. Microchannel bus 44 includes data lines, command lines, address lines and may include an arbitration line. DASD controller 160 controls the storage of data to and the recovery of data from a fixed disk drive 171. Conventionally, device controller 160 includes buffer 178 for temporarily holding data in transit between a host system and disk drive 171. Control unit 160 and buffer 178, in particular, are controlled by a processor unit 176.

Processor unit 176 may be initialized upon system power up, or it may have access to a small read only memory (ROM) 180 and a small non-volatile random access memory (NVRAM) 182 for configuration information. ROM 180 may hold a supervisor program executable on processor unit 176 to carry out the process of the invention. Non-volatile RAM is currently relatively expensive and preferably minimally sized. Any device to which controller unit 160 is connected becomes an initiator for operations on disk drive 171.

III. Disk Formatting Process with Selective Hiding of Defects

Figure 6:
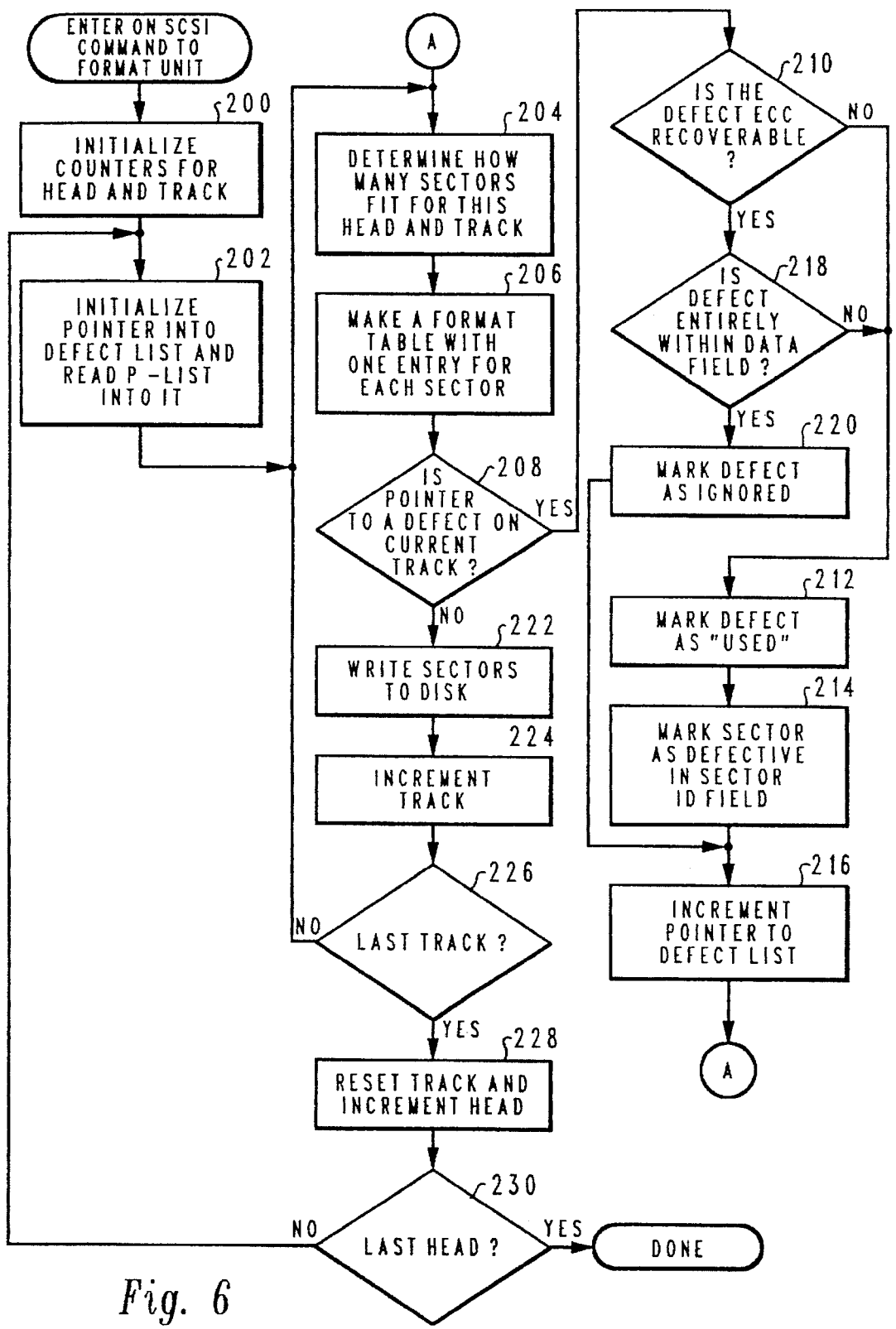
FIG. 6 is a logical flow chart of a process for selectively hiding marginally defective areas of a disk drive from an initiator.

FIG. 6 is a logical flow chart of a process executed responsive to the SCSI format unit command in which sectors listed in a P-list are selectively hidden from the initiator of the command. The P-list is sorted by head and track and from beginning to end of each track. The process is entered at step 200 with initialization of counters for head and track for the disk formatting process. Next, with execution of step 202 the P-list is read into a defect list and a pointer into the defect list is initialized. Step 204 is executed to determine how many sectors fit the current head and track. In some systems step 206 may be used to open a format table for the current track in a predetermined sector of the track. As described below, the format table has an entry for each sector. Initially the table indicates each sector as usable. In systems not utilizing a format table, step 206 is omitted. Sector ID fields 152 are changed at the appropriate times to indicate defective sectors.

Application of the P-list to the operation of formatting the disk is now considered. At step 208 the entry in the defect table to which the pointer currently points is examined to determine if there is a defect on the current track. If there is, the YES branch from step 208 is taken to step 210 where the grade of the defect is checked. While a virtual continuum of grades for areas of the disk are conceivable, it is presently contemplated that defective areas will be marked as suitable for supporting data backed by ECC or as unsuitable for use. Implicitly, the surface of a disk is categorized as being of one of three grades: suitable for all uses (not in P-list); suitable for use with redundant data backup (in P-list); and unsuitable for any use (in P-list).

Grade of the defect and location of the defect in relationship to a proposed data field result in differing treatment. If a defect makes the concerned sector unsuitable for any use, the NO branch is taken from step 210 to step 212 to mark the defect as used in the P-list. Step 214 is then executed to mark the affected sector in its sector ID field 152. If a format table was used, the appropriate entry is now changed to indicate the defect. Next, at step 216, the pointer into the defect list is incremented and processing returns to step 204 via connector A. If a defect allows use of the sector with redundant data, the YES branch form step 210 is taken to step 218. At step 218 it is determined if the defect lies entirely within a data field. If it does not the sector is not used. The NO branch is taken from step 218 to step 212 and processing continues as described above. If the defect lies entirely within a data field, the YES branch is taken from step 218 to step 220 and the defect is marked as ignored in the P-list. No change in the format table is required for the involved sector. Processing continues with step 216.

Once defects have been marked as used or ignored, or if no defects exist for a track, the NO branch is taken from step 208 to step 222. At step 222 sectors are written to the disk.

Steps 224–230 concern looping control of the process. Each track of the storage unit is handled in the same way, with the process being exited once all surfaces have been formatted. Step 224 provides for incrementing the track counter. At step 226 it is determined if the track count indicates that all tracks for a surface have been formatted. If not, processing is returned to step 202. If the last track for a surface has been formatted, the track counter is reset and the head counter is incremented at step 228. At step 230 it is determined if the last head (i.e. surface) has been taken formatted. Once the last surface is formatted the process is exited.

FIGS. 7A and 7B illustrate data structures utilized by the process of FIG. 6. FIG. 7A is a data structure for a P-list, which identifies questionable portions of the disk surface in terms of track and head numbers and offsets from a permanent index for the disk to the beginning point and end point of the defect. A grade field may be set to one of a plurality of values indicating degree of suitability for particular uses. The grades will be based upon expected error rates if the sector is used to record data. In the preferred embodiment two levels are identified by the field: (1) available for use with ECC back up having a known error correction capacity; and (2) unavailable. As the disk is formatted a flag is set in the entries in the P-list to indicate if the sector was "ignored" or "used".

FIG. 7B is a format table used by some systems placed at the beginning (relative to the disk index) of each track after the track has been formatted. It has a field for each sector indicating whether the sector is good (*) or defective (D). In disk drives supplied by International Business Machines Corporation using SCSI, format tables are not used.

The invention permits performing write and read operations on areas of disks formally unusable because of marginal quality. Selection of sites on a disk for receiving particular types of data is made possible, thereby improving yield. The invention also provides for reporting only "used" defects in response to issuance by an initiator of the "Read Defect Command." This results in a higher perceived quality level.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:

a data storage device having a recording surface mounted for rotation and means for reading data from and writing data to said recording surface;

a defect list for said recording surface itemizing selected areas of said recording surface by location and size and graded in at least three categories, including:
   suitable for all use;
   suitable for use with redundant data backup;
   unsuitable for any use; and means utilizing the defect list for designating selected ones of said areas of the recording surface to receive differing types of written data according to differing error tolerance and designating other ones of said areas of the recording surface as defective so as to receive no written data.

2. The data processing system as set forth in claim 1, wherein there are a plurality of said recording surfaces and each recording surface has a plurality of tracks centered on an axis of rotation for the recording surface.

3. The data processing system as set forth in claim 2, wherein the means for utilizing includes:

means for determining a number of zones into which each track can be divided;

means for tentatively scheduling field types for each zone;

a plurality of markings on the recording surface indicating availability or unavailability of the zones;

means for comparing the tentatively scheduled field types for a zone with any defect list entry corresponding in location to the zone to determine if the zone is qualified for recording the field types; and means responsive to results from the means for comparing for scheduling availability or unavailability of each zone having a corresponding defect list entry by using the markings.

4. The data processing system as set forth in claim 3, wherein zones correspond to sectors and a plurality of field types are permitted in a sector.

* * * * *